United States Patent [19]

Just et al.

[11] Patent Number: 4,813,489
[45] Date of Patent: Mar. 21, 1989

[54] FOLDABLE PACKER HARROW IMPLEMENT

[75] Inventors: Murray K. Just; Lawrence S. Grodecki; James W. Henry; Glenn M. Hantke, all of Yorkton, Canada

[73] Assignee: Morris Rod-Weeder Co., Ltd., Yorkton, Canada

[21] Appl. No.: 135,825

[22] Filed: Dec. 21, 1987

[51] Int. Cl.$^4$ ............................................. A01B 73/00
[52] U.S. Cl. ...................................... 172/175; 172/180; 172/311; 172/456; 172/662
[58] Field of Search ................ 172/170, 174, 175, 179, 172/180, 198, 311, 452, 456, 458, 478, 482, 488, 662

[56] References Cited

U.S. PATENT DOCUMENTS

| | | | |
|---|---|---|---|
| 2,750,724 | 6/1956 | Stephenson | 172/488 |
| 2,963,098 | 12/1960 | Kesselring | 172/677 |
| 4,418,762 | 12/1983 | Page | 172/311 |
| 4,619,330 | 10/1986 | Machnee | 172/456 |

FOREIGN PATENT DOCUMENTS

| | | |
|---|---|---|
| 838417 | 4/1970 | Canada . |
| 871991 | 6/1971 | Canada . |
| 1081021 | 7/1980 | Canada . |
| 1099566 | 4/1981 | Canada . |
| 1212569 | 10/1986 | Canada . |

OTHER PUBLICATIONS

Laurier, Harrow Packer Bar, Series 200 (brochure 4 pages).
Blanchard Hydra-Lift (brochure 2 pages).
Flexi-Coil, Winter-Spring 85/86 (brochure 2 pages).
Rite Way Hydraulic Harrow/Harrow Packer Drawbars (brochure 4 pages).
Bourgault Convert-A-Bar (brochure 4 pages).

Primary Examiner—Deborah L. Kyle
Assistant Examiner—John W. Eldred
Attorney, Agent, or Firm—Hovey, Williams, Timmons & Collins

[57] ABSTRACT

An agricultural implement useful to prepare the ground before or after a seeding operation includes a number of soil packer units which are directly coupled to transversely extending tool bars or frame members ahead of respective, trailing harrow sections. The packer units are connected to the frame members by relatively short links for free up and down shifting movement during advancement of the implement across the field in substantial independence of vertical movement of the harrow sections. The frame members are pivotal about a parallel, horizontal axis to raise the harrow sections and the packer units to an upright orientation for transport, at which time a portion of the links supporting the packer units comes into firm, resting contact with a stop for precluding further movement of the packer units. The relatively heavy packer units are located in proximal relation to the axis of pivotal movement of the frame members, to thereby reduce stresses imposed on the structural components of the implement and reduce the size and cost of the hydraulic piston and cylinder assembly for raising or lowering the harrow sections and packer units. In use, the trailing harrow sections smooth the compacted ground and function to reduce water and wind erosion, enhance soil moisture retention and leave weeds on top of the ground to prevent further growth of the same.

13 Claims, 3 Drawing Sheets

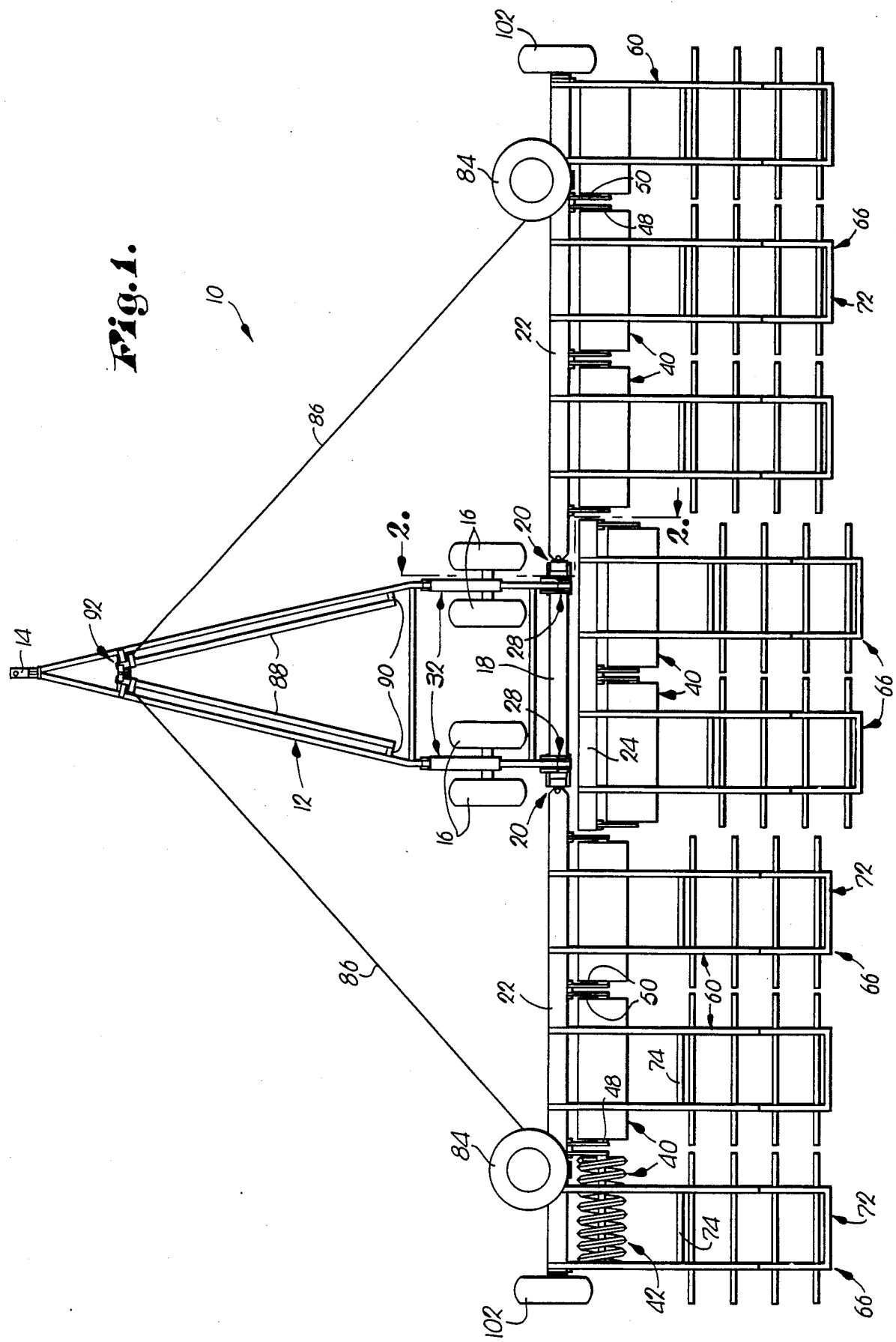

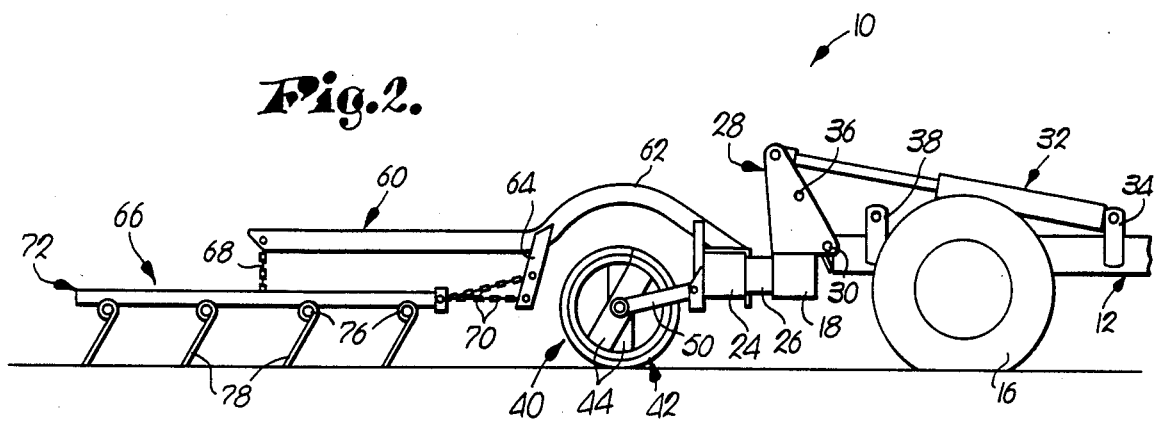
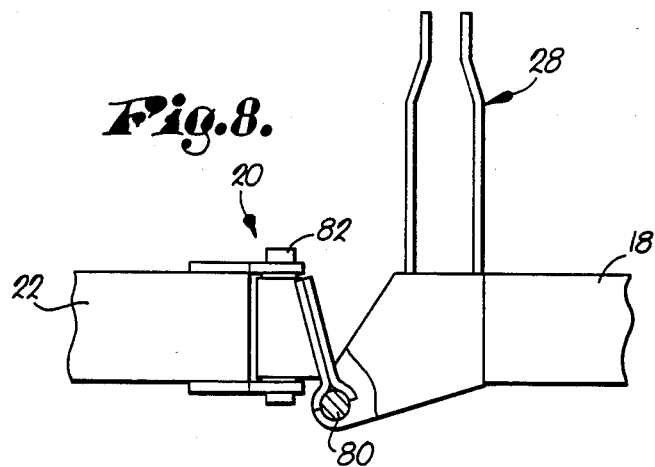
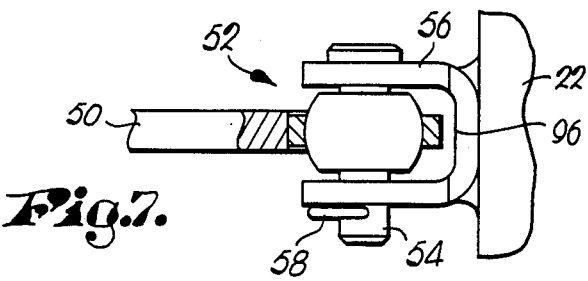
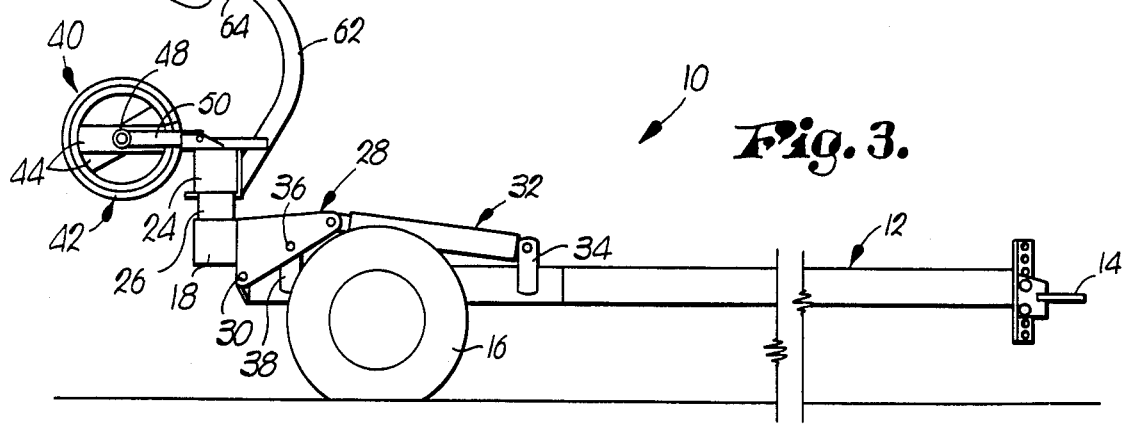

FOLDABLE PACKER HARROW IMPLEMENT

BACKGROUND OF THE INVENTION

1. Field of the Invention

The present invention relates to an agricultural implement having a plurality of soil packer units which are each positioned ahead of a respective, independent harrow assembly.

2. Description of the Prior Art

Compaction of soil around newly planted seed has long been known to substantially increase crop yield. In the past, soil compaction has sometimes been provided by a number of relatively heavy packing wheels mounted on a cultivator, but unfortunately the packing wheels may cause a substantial amount of stress to be imposed on frame members of the cultivator, and the wheels may also present problems during transport. Certain cultivators have springs to apply force to the packer wheels, but uneven depth control of the cultivator may occur when the weight of the cultivator is less than the forces imposed on the packer wheels.

In recent times, increased interest has been directed toward the concept of soil compaction by means of a series of coil packers coupled to the trailing ends of harrow assemblies. Examples of these types of harrow packer units are shown in U.S. Pat. No. 4,418,762 and Canadian Pat. Nos. 838,417, 871,991, 1,081,021, 1,099,566, and 1,212,569. The coil packer creates a herringbone pattern on the ground which, according to some, is useful for reducing wind and water erosion.

However, certain problems have been observed in connection with the herringbone pattern left in the soil after use of a harrow packer unit. In particular, water uptake by the soil is decreased once the sidewalls of the herringbone packer tracks become hard and crusted, and evaporation losses are increased upon formation of puddles in the tracks. Existing soil moisture may be readily lost due to capillary action within the crusted, packed soil of the tracks which is directly exposed to the atmosphere. Also, the wave-like herringbone pattern increases the total exposed surface area of the field, which causes a corresponding increase in total evaporation losses. Moreover, water runoff is more likely to occur in packed grooves than might occur, for instance, in loose soil.

Other problems that have been observed with regard to harrow packer units include the tendency for the coil packers to reintroduce weeds into the ground that have previously been uprooted during airseeding or during harrowing, thereby encouraging the weeds to continue to grow and compete with the crop. In addition, harrow packer units tend to leave finely crushed soil on the top surface of the ground where it is susceptible to erosion by wind and water.

In some harrow packer units, coil packers are arranged in staggered disposition relative to the normal direction of travel of the implement. In this manner, the width of each coil packer can be increased in an attempt to eliminate missed areas of the ground not subjected to the forces of the coil. However, during relatively sharp turns, some areas of the ground may be left untouched due to the large distance between the coil packers and the axis of turning movement of the implement. Also, such construction increases the cost of the coil packers in proportion to the increased width of the same.

Another problem associated with harrow packer units is due to the relatively complex and expensive mechanism that is often provided for folding the unit into and out of an orientation for transport. In these devices, arms supporting the harrow assemblies are fixed to a transversely extending structural frame member which is selectively pivotable about an axis parallel to its longitudinal axis for raising the unit toward a folded orientation. However, the relatively heavy coils are pivotally coupled by means of an elongated hitch to the trailing ends of the harrow support arms, and therefore relatively stiff structural members and large hydraulic piston and cylinder assemblies are needed for developing sufficient torque to overcome the moment presented by the packer coils and raising the arms toward a vertical orientation. In addition, the coil packers of the folded unit, being supported solely on one side of the harrow by the now overlying pivotal connection, are free to sway and thus present a somewhat unstable arrangement during transport of the unit.

Furthermore, unfolding of the aforementioned harrow packing units requires skill and closely timed operator coordination since the unit must be advanced slowly at a creep speed as the packers are lowered to the ground. Other problems which are encountered in harrow packer units of this type include the tendency of the packers and harrow sections to bind during turns while the unit is in its folded, transport orientation which may lead to serious damage to the tines.

SUMMARY OF THE INVENTION

Our present invention overcomes the problems noted above by provision of a packer harrow implement having a number of packer units directly coupled to a transversely extending frame member or tool bar, with harrow sections carried behind the packer units by elongated, arched carrier arms extending over the packer units. Each of the packer units is connected by means of short, pivotal links to the frame member for up and down shifting movement in substantial independence of the vertical movement of the trailing harrow sections.

A number of important benefits are realized by use of the present invention. By mounting the coil packers ahead of the harrow sections, clumps and clods of soil as well as trash are left on the top of the ground, thereby functioning as a barrier to prevent moisture loss through capillary action. The clumps, clods, and trash reduce wind and water erosion, and the trash cover enhances moisture intake into the soil from rain and also facilitates subsequent retention of the moisture. Weeds pulled from the soil by the harrow tines are left on the ground surface to die instead of being reintroduced into the ground for additional growth as is observed with conventional apparatus.

Advantageously, the location of the relatively heavy packer units, in close, proximal relationship to the tool bar or frame member, greatly reduces the moment developed during pivotal movement of the frame member about an axis parallel to its longitudinal axis to raise the packer units and harrow sections toward an upright orientation for transport. The moment developed is considerably less than the moment which occurs during lifting of prior art harrow packer implements having the packer coils or drums located behind the harrow sections and at some distance from the pivotal, transverse structural frame member or tool bar. As such, the size and strength of the structural members as well as the hydraulic piston and cylinder assembly of the present invention can be substantially smaller than heretofore realized, thereby affording a significant cost savings.

In preferred embodiments of the invention, the short links interconnecting the packer units and the frame members are movable toward a position of firm, resting contact with the frame member when the latter is pivoted for raising the packer units and harrow sections toward their upright, transport orientation. As a result, the weight of the packer units when lifted toward a transport orientation causes the units to be retained in secure engagement with the frame mebers without oscillating or moving laterally as the implement is transported at relatively fast speed. In addition, the elevation of the packer units when in the transport mode remains relatively close to the ground so that the center of gravity of the raised implement is significantly lower than in prior art structures, thereby enhancing the stability of the assembly during on or off the road travel.

Moreover, the implement constructed in accordance with the invention may be readily folded or unfolded out of its transport orientation without interference or tangling between the packer units and the harrow sections, inasmuch as the harrow sections are at all times kept out of contact with the packer units. During unfolding, the implement need not be advanced at a creep speed as is the case with foldable harrow packer implements which are articulated between the harrows and the trailing packers. Moreover, since the harrow sections of the present invention are located at a distance from the pivotal frame member, the harrow sections may be easily raised from the ground when plugged without interrupting the advancement of the implement or raising the packer units away from the earth.

Another important aspect of the present invention relates to the preferred construction of the packer units which are in the form of a generally helical coil. In particular, end regions of each packer coil extend in directions somewhat different than the remaining, major extent of the coil and terminate at a location closely adjacent a portion of a neighboring convolution, thereby shortening the overall width of the packer unit. As a result, the end-to-end clearance between adjacent packer units may be decreased so that satisfactory soil compaction is provided across the entire width of the implement without the necessity of, for instance, staggering the packer units to obtain full coverage as is the case with certain conventional harrow packer implements.

The coil packers, being located closely adjacent the transverse tool bars or frame members, offer excellent clearance in turns. The coil packers are thereby also disposed at a relatively short distance to any axis about which the implement is turned, thus substantially eliminating the presense of missed regions of the soil not subjected to compaction. The packers and harrow sections do not bind against each other and damage the tines. Moreover, the two coil packers which are located adjacent opposite transverse ends of the implement are preferably somewhat shorter than the remaining coil packers, so that the two endmost harrow sections cover the tracks left by the field tires while the tires function to provide soil compaction in regions outboard of the packer units.

BRIEF DESCRIPTION OF THE DRAWINGS

FIG. 1 is a plan view of a packer harrow implement constructed in accordance with the invention;

FIG. 2 is a fragmentary, enlarged, side elevational view of the implement taken along line 2—2 of FIG. 1;

FIG. 3 is a view somewhat similar to FIG. 2 except that transversely extending tool bars or frame members of the implement have been pivoted to raise the packer unit and harrow sections from the ground;

FIG. 7 is an enlarged, fragmentary plan view in partial section of one of the links for the coil packer units shown in FIGS. 1–6 which is connected to a ball and socket coupling detachably secured to one of the frame members; and FIG. 8 is an enlarged, fragmentary, side elevational view with parts broken away in section of a pivotal interconnection between a wing frame member and a main frame member of the implement depicted in FIGS. 1–7.

DETAILED DESCRIPTION OF THE DRAWINGS

Figure 4:
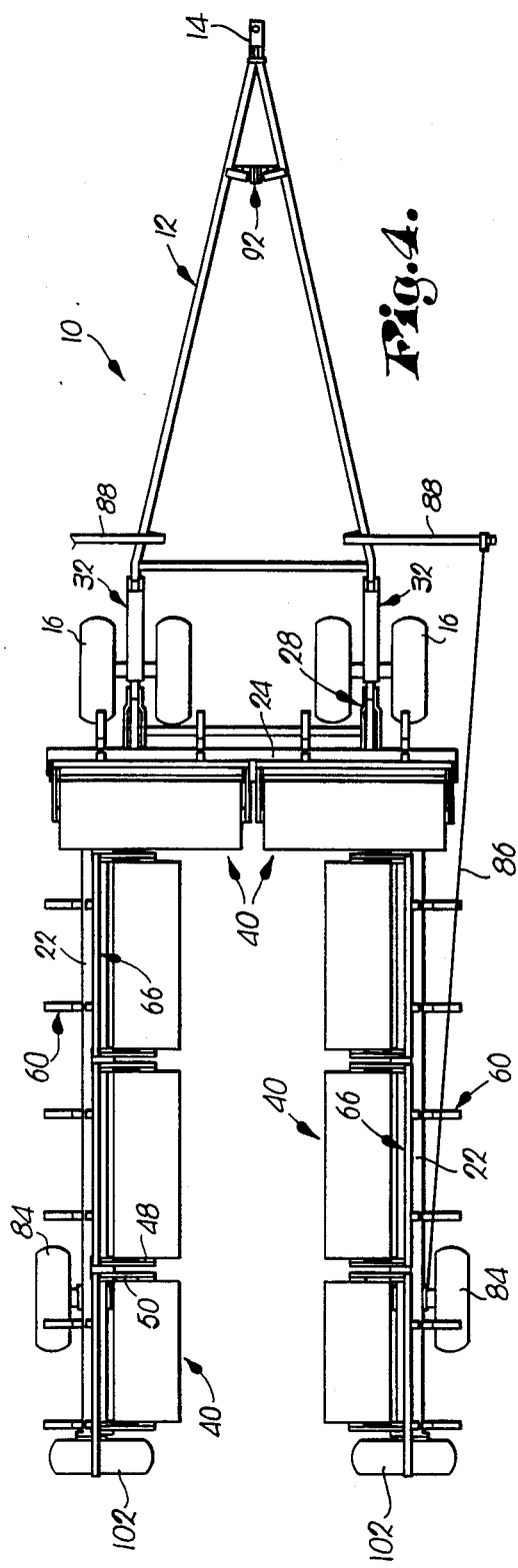
FIG. 4 is a plan view of the implement shown in FIG. 1 except that the harrow sections and packer units have been raised and then folded to an orientation for transport.
Figure 6:
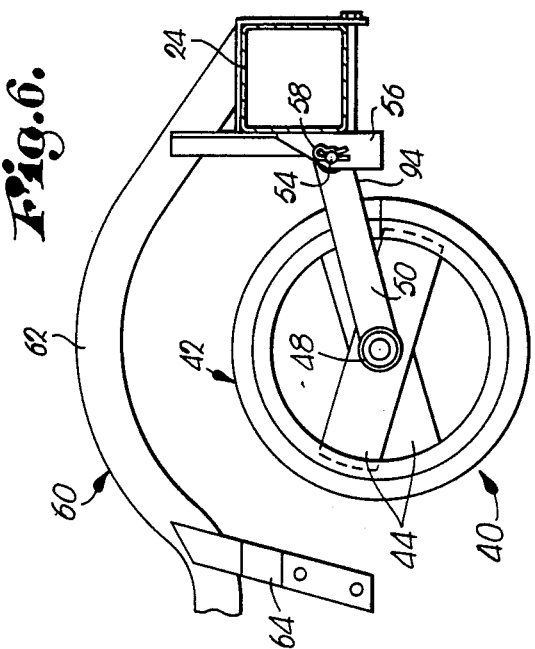
FIG. 6 is a fragmentary, enlarged, side cross-sectional view of the frame member and packer unit shown in FIG. 5 along with a portion of an overlying, arched carrier arm for a trailing harrow section.

An agricultural implement, broadly designated by the numeral 10 in FIGS. 1–8, has hitch structure 12 with a forward end portion 14 that is depicted in FIGS. 1, 3, and 4. The hitch structure 12 is supported by four parallel wheels 16, and the forward end portion 14 of the hitch structure 12 is adapted for connection with a towing vehicle (not shown) that is movable in an advancement direction over the ground and along a path of travel.

As best illustrated in FIG. 1, the implement 10 has a main frame member 18 which is connected on each end by pivotal couplings 20 to an inboard end of a respective wing frame 22. A center frame member 24 is fixed to the main frame member 18 by means of bars 26 that can be observed by reference to FIGS. 2 and 3.

Referring to FIGS. 1–3 and 8, a pair of bracket assemblies 28 are securely connected to opposite end portions of the main frame member 18 and are each coupled by means of a pivot 30 (FIGS. 2 and 3) to a trailing end of the hitch structure 12. An outermost portion of each bracket assembly 28 is pivotally secured to one end of a hydraulically powered piston and cylinder assembly 32, the remaining, forward ends of which are pivotally coupled to upstanding legs 34 (FIGS. 2 and 3) fixed to side members of the hitch structure 12.

By comparison of FIGS. 2 and 3, it can be seen that simultaneous retraction of the pistons of piston and cylinder assemblies 32 lifts the main frame member 18 as well as wing frame members 22 and center frame member 24 for swinging movement about a horizotal axis coincident with pivots 30. Once the frame members 18, 22, 24 have been shifted from their use orientation shown in FIG. 2 to their transport orientation illustrated in FIG. 3, a pin connection (not shown) may be inserted through an aperture 36 in the bracket assemblies 28 as well as a corresponding aperture in an upstanding leg 38 affixed to structure 12 in order to releasably lock the members 18, 22, and 24 in their transport orientation.

Figure 5:
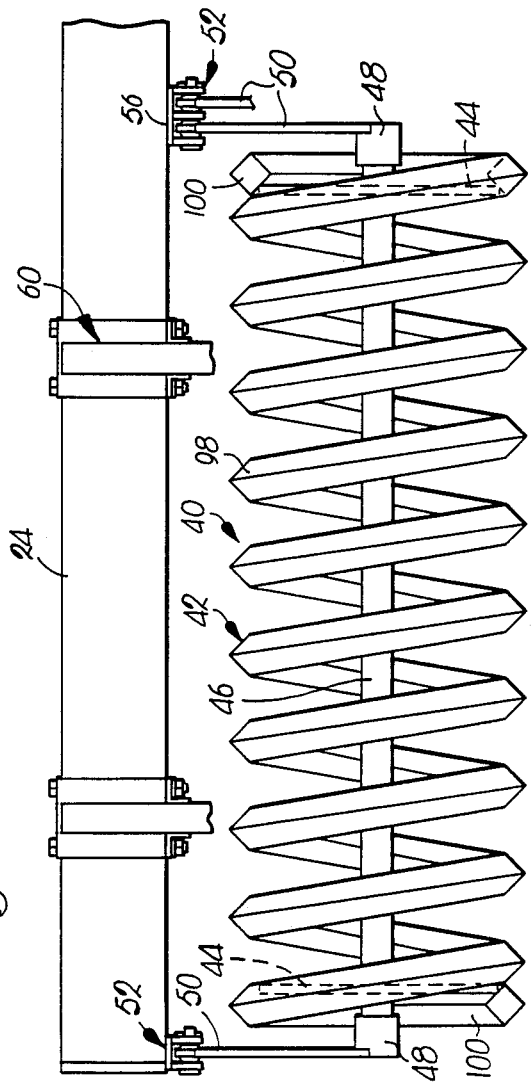
FIG. 5 is an enlarged, fragmentary plan view of one of the frame members and packer units.

Implement 10 further includes a number of soil packer units 40 which are disposed directly behind a respective one of the frame members 22, 24. Preferably, each of the packer units 40 is comprised of a generally helically shaped coil packer 42 as is shown in FIGS. 1 and 5, although other types of packer units such as crowfoot packers may also be employed.

Each of the coils 42 is fixed on opposite ends to bar-like supports 44 (see, in this regard, FIGS. 5 and 6) which, in turn, are securely connected to a shaft 46 disposed along the central, longitudinal axis of coil 42. End sections of the shaft 46 are received in respective bearings 48 that are connected to trailing ends of short links 50, the forward ends of which are fixed to a swivel or ball and socket connector 52.

The ball and socket connector 52 is better shown in FIG. 7, where it can be observed that a pin 54 extends through a central bore in the connector 52 as well as aligned holes in opposed legs of a U-shaped bracket 56 that is fixed to a side of one of the square-in-cross section wing frame members 22, although a similar arrangement is employed for coupling the connectors 52 of the central coils 42 to the center frame member 24. The pin 54 is releasably retained in place by means of a hairclip 58, so that the packer units 40 may be readily detached from the implement 10 when desired.

A number of spaced, parallel carrier arms 60 are securely coupled to frame members 22, 24 and extend rearwardly relative to the advancement direction of the hitch structure 12 in parallel relation to the path of travel of the implement 10 over the ground. Each of the arms 60 has a raised or arched section 62 that curves over and around the coils 42 therebeneath. A relatively short, elongated leg 64 is fixed to each of the arms 60 directly behind the arched section 62 in generally transverse relation to the direction of extension of arms 60.

Each adjacent pair of the carrier arms 60 supports a leveling device for smoothing the soil. In the particular embodiment illustrated in the drawings, each leveling device is in the form of a harrow section 66 coupled to the carrier arms 60 by means of flexible strap means or chains 68, 70. Chains 68 interconnect a mid-region of each harrow section 66 and an end portion of each carrier arm 60, while chains 70 interconnect a forward region of each harrow section 66 and lower regions of legs 64.

Viewing FIGS. 1-3, each of the harrow assemblies or sections 66 includes a rectangular framework 72 having a transversely extending front element 74 (FIG. 1). Four parallel, spaced carrier pipes 76 are fixed to the underside of framework 72, and each pipe 76 carries a number of slender, yieldable spring tines 78 (FIGS. 2 and 3).

When the implement 10 is in its use orientation as shown in FIGS. 1 and 2, and 5-8, the chains 68 are slack and the front chains 70 are operable to pull the sections 66 in a forwardly direction. However, as the frame members 22, 24 are shifted about pivot 30 by means of piston and cylinder assemblies 32 to the transport orientation as shown in FIG. 3, chains 68 function to limit the extent of the downwardly shifting movement of the harrow sections 66 and retain the same in proximal relation to arms 60.

A better understanding of the couplings 20 interconnecting the wing frame members 22 and the main frame member 18 may be obtained by reference to FIG. 8. As shown, the coupling 20 includes a pivotal connection 80 which allows independent, up and down swinging movement of the respective wing frame 22 relative to the main frame member 18 when the implement 10 is in its field or use orientation as is shown in FIG. 1. Also, once the piston and cylinder assemblies 32 have been retracted to pivot the frame members 18, 22, 24 to their transport orientation as is shown in FIG. 3, the two wing frame members 22 are swingable about the now vertically oriented pivotal connection 80 in a rearwardly direction and toward the configuration as shown in FIG. 4 so that the implement 10 presents a relatively narrow profile for transport. In this orientation, a second pivotal connection 82 of coupling 20, disposed in offset, perpendicular relation to pivotal connection 80, enables up and down swinging movement of the wing frame members 22 relative to the main frame member 18 and the hitch structure 12 as a pair of transport wheels 84 roll over the ground.

As illustrated in FIG. 1, a pair of wire cables 86 are fixed to the front end of respective, elongated bars 88 that are each coupled to a corresponding side of the hitch structure 12 by means of a pivotal joint 90. The remaining end of each cable 86 is connected to one of the wing frame members 22 in order to retain the latter in alignment with the main frame member 18 as the implement 10 is advanced over the ground in its use orientation. A latch 92, mounted on the forward end portion 14 of hitch structure 12, is releasable to enable the bars 88 to swing about respective joints 90 for allowing the wing frame members 22 to be shifted rearwardly toward their folded, transport orientation shown in FIG. 4. Each of the bars 88 is biased downwardly toward their orientation as shown in FIG. 1 by means of a spring (not illustrated) so that the cables 86 do not become entangled with remaining components of the implement 10 during folding or unfolding of the latter.

It can now be appreciated that during use of the imlement 10, the short, pivotal links 50 directly interconnecting the coil packers 42 and the frame members 22, 24 are shiftable up and down in substantial independence of the movement of the carrier arms 60. Moreover, the ball and socket connectors 62 function to enable the orientation of the packer coils 42, and particularly the central axis of the coils 42, to tilt in either direction slightly from horizontal in order to follow the contours of the ground without affecting the position or orientation of the respective trailing harrow section 66. The arched section 62 of the carrier arms 60 provides sufficient clearance for avoiding contact with the coils 42 therebelow as the latter ride in complete freedom over large stones or other obstacles in the field without damage to the body of the coils 42.

Each of the coils 42 rolls smoothly over the ground during advancement of the implement 10 to roll and pack the soil and thereby enable the harrow sections 66 to travel along a smoother path. In addition, the trailing harrow section 66 smoothes and levels the ground, pulls up weeds and leaves the trash and coarse particles on the ground surface to thereby reduce wind and water erosion and enhance soil moisture retention, while also leaving the weeds on top of the ground to die.

Upon completion of the work operation, the piston and cylinder assemblies 32 are retracted to simultaneously raise the frame members 22, 24 and the associated packer units 40 and harrow sections 66 toward their upright, transport orientation as shown in FIG. 3. At the same time, a portion 94 (FIG. 6) of each of the packer unit links 50 moves toward a position of firm, resting contact with a stop means or wall surface 96 (FIG. 7) which is formed as part of the associated bracket 56. Therefore, the relatively heavy coil packers 42, which may, for example, weigh as much as a 150 pounds per lineal foot, are securely supported by the respective frame member 22, 24 when lifted to a transport orientation and do not shift or bounce during relatively high speed road transport of implement 10.

Furthermore, it can now be understood that the disposition of the packer coils 42, in forward relation to the harrow sections 66, is highly advantageous in that the mass of the packer coils 42 is retained at all times in close, proximal relation to the supporting frame members 22, 24. Thus, the size of the piston and cylinder assemblies 32 and strength and stiffness of the structural members such as members 22, 24 is smaller than what would be otherwise be necessary. The swinging movement of the links 50 toward the position shown in FIG. 3 in contact with the wall surfaces 96 lowers the center of gravity of the implement 10 somewhat in disposition closer to the ground as well as the pivotal connection 30 and the supporting wheels 16.

Finally, reference is made to FIG. 5 for a more detailed understanding of the coil packers 42 of the present invention. Specifically, the coil packer 42 is comprised of a body having a major, central region 98 with convolutions extending in a direction inclined relative to reference planes perpendicular to the longitudinal axis of packer 42 (which is coincident with the longitudinal axis of shaft 46). The body also includes two opposed end regions 100 integrally connected to the central region 98 and extending in respective, parallel reference planes that are perpendicular to the longitudinal axis of shaft 46. In this manner, each of the coil packers 42 terminates at a location closely adjacent one of the convolutions of the major, central region 98, to thereby effectively tuck the free ends of the coil packers 42 inwardly and reduce the overall length of the same.

As a consequence, each of the coil packers 42 can be positioned in closely spaced, end-to-end disposition relative to the remaining coil packers 42 without leaving a substantial area of uncompacted soil as the implement 10 is advanced over the ground. Furthermore, the two endmost coil packers 42, located at the outboard end of each wing frame member 22, are advantageously somewhat shorter than the remaining coil packers 42 so that the trailing harrow sections 66 are of a width sufficient to cover the tracks left by field wheels 102 rotatably mounted on the outboard ends of wing frame members 22. Moreover, by practice of the present invention, the field wheels 102 are not damaged when the implement is folded to its transport orientation, in comparison to certain of the conventional implements where harrow sections and packer coils are in contact with the field wheels during transport of the implement.

If desired, the implement 10 may be used for smoothing the ground without compaction thereof by removal of the hair clips 58 and pins 54 in order to detach the packer units 40 from frame members 22, 24. As an alternative, one may wish to compact the soil without use of the harrow sections 66 which can easily be accomplished by disconnecting chains 68, 70.

Although the foregoing represents a detailed description of a currently preferred embodiment of our invention, it is to understood in this regard that various modifications or additional may be effected to the structure shown in the drawings without departing from the gist and essence of our contribution to the art. Accordingly, the invention should be deemed limited only by a fair scope of the claims which follow along with their mechanical equivalents thereof.

We claim:

1. An agricultural implement comprising:
   structure adapted for connection with a towing vehicle movable in an advancement direction along a path of travel;
   an elongated frame member coupled to said structure for movement therewith and extending in a direction generally transverse to said path of travel;
   arm means connected to said frame member and extending rearwardly relative to said advancement direction;
   a harrow assembly coupled to said arm means;
   a soil packer unit; and
   link means extending in a generally rearwardly direction relative to said advancement direction and directly interconnecting said soil packer unit and said frame member,
   said link means being of an overall length shorter than said arm means for maintaining said packer unit in forward disposition relative to said harrow assembly in directions parallel to said path of travel,
   said link means being pivotally connected to said frame member for enabling up and down movement of said packer unit in substantial independence of vertical movement of said arm means.

2. The invention as set forth in claim 1, wherein said arm means comprises two spaced arms which are fixed to said frame member and include an arched portion overlying said packer unit for avoiding interference with said packer unit during up and down movement of the same.

3. The invention as set forth in claim 1, wherein said frame member is pivotally coupled to said structure for selective movement about a horizontal axis between a generally horizontal orientation for use and an upright, transport orientation, and wherein said link means includes a flat portion movable toward a position of firm, resting contact with said frame member when said frame member is shifted to said upright orientation.

4. The invention as set forth in claim 1, wherein said packer unit comprises a body having a generally helical configuration.

5. The invention as set forth in claim 1 wherein said arm means includes a leg extending in a direction generally perpendicular to the direction of extension of said arm means and connected to said harrow assembly for pulling said harrow assembly when said frame member is in said use orientation.

6. The invention as set forth in claim 1; and including means for permitting movement of said soil packer unit between an orientation parallel to said frame member and any one of a number of orientations inclined relative to said frame member in order to enable said packer unit to follow the contours of the ground.

7. The invention as set forth in claim 1, wherein said frame member presents an end portion; and including a wheel rotatably connected to said end portion of said frame member, and wherein said harrow assembly extends in a direction transverse to said path of travel past said soil packer unit a dimension sufficient to cover any tracks left by said wheel.

8. An agricultural implement comprising:
   structure defining a hitch having a forward end adapted for connection with a towing vehicle movable in an advancement direction along a path of travel;

an elongated frame member extending in a direction generally transverse to said path of travel;

pivot means coupling said frame member to said structure for selective shifting movement of said frame member between a use orientation and a transport orientation;

arm means connected to said frame member and extending rearwardly relative to said advancement direction;

a harrow assembly coupled to said arm means;

a soil packer unit;

link means extending in a generally rearwardly direction relative to said advancement direction and directly interconnecting said packer unit and said frame member, said link means being of a configuration for maintaining said packer unit in forward disposition relative to said harrow assembly in directions parallel to said path of travel, said link means being swingable relative to said frame member when said frame member is in said use orientation for enabling shifting, up and down movement of said packer unit in substantial independence of movement of said arm means, said link means including a portion movable toward a position of firm, resting contact with said frame member when said frame member is shifted to said transport orientation for supporting said packer unit in close disposition to said pivot means while in underlying relation to said harrow assembly.

9. The invention as set forth in claim 8, wherein said pivot means include structure for enabling movement of said soil packer unit between an orientation parallel to said frame member and any one of a number of orientations inclined relative to said frame member to permit said packer unit to follow the contours of the ground.

10. An agricultural implement comprising:

structure defining a hitch having a forward end adapted for connection with a towing vehicle movable in an advancement direction along a path of travel;

an elongated frame member extending in a direction generally transvese to said path of travel;

pivot means coupling said frame member to said structure for selective movement of said frame member between a raised, use orientation and a lowered, transport orientation;

a soil packer unit; and link means extending in a generally rearwardly direction relative to said advancement direction and directly interconnecting said packer unit and said frame member, said link means being swingable relative to said frame member when said frame member is in said use orientation for enabling shifting, up and down movement of said packer unit, said link means including a portion movable toward a position of firm, load-supporting, abutting contact with said frame member when said frame member is shifted to said transport orientation for supporting said packer unit in close disposition to said pivot means.

11. The invention as set forth in claim 10, wherein said frame member moves through a first arc during said shifting movement between said use orientation and said transport orientation, and wherein said link means moves through a second arc as said frame member is shifted to said transport orientation, and wherein said first arc and said second arc extend in generally opposite directions.

12. The invention as set forth in claim 11, wherein said portion of said link means extends in a generally horizontal direction when in said position of contact with said frame member.

13. The invention as set forth in claim 12, wherein said soil packer unit presents opposite end portions, and said link means comprises two rigid links interconnecting said frame member and said opposite end portions of said packer unit.

* * * * *